United States Patent
Patterson et al.

(10) Patent No.: US 10,176,171 B1
(45) Date of Patent: Jan. 8, 2019

(54) LANGUAGE AGNOSTIC COMMAND-UNDERSTANDING DIGITAL ASSISTANT

(71) Applicant: AIQUDO, INC., San Jose, CA (US)

(72) Inventors: David Patterson, Jordanstown (GB); Vladimir Dobrynin, Saint Petersburg (RU); Gary Russell Marrs, Ballymena (GB)

(73) Assignee: AIQUDO, INC., San Jose, CA (US)

( * ) Notice: Subject to any disclaimer, the term of this patent is extended or adjusted under 35 U.S.C. 154(b) by 0 days.

(21) Appl. No.: 15/988,620

(22) Filed: May 24, 2018

Related U.S. Application Data

(60) Provisional application No. 62/611,996, filed on Dec. 29, 2017.

(51) Int. Cl.
  *G06F 17/28* (2006.01)
  *G06F 17/30* (2006.01)
  *G06F 9/451* (2018.01)

(52) U.S. Cl.
  CPC ............ *G06F 17/289* (2013.01); *G06F 9/453* (2018.02); *G06F 17/30867* (2013.01)

(58) Field of Classification Search
  CPC ... G06F 17/289; G06F 9/453; G06F 17/30867
  See application file for complete search history.

(56) References Cited

U.S. PATENT DOCUMENTS

| | | | | |
|---|---|---|---|---|
| 5,873,064 | A * | 2/1999 | De Armas | G06F 3/16 704/275 |
| 6,125,347 | A * | 9/2000 | Cote | G10L 15/26 704/270 |
| 9,280,610 | B2 * | 3/2016 | Gruber | G06F 17/30976 |
| 9,633,004 | B2 * | 4/2017 | Giuli | G10L 15/1822 |
| 9,966,065 | B2 * | 5/2018 | Gruber | G06F 17/2705 |
| 9,972,304 | B2 * | 5/2018 | Paulik | G10L 15/01 |
| 2009/0254336 | A1 * | 10/2009 | Dumais | G06F 9/451 704/9 |
| 2014/0156282 | A1 * | 6/2014 | Madere | G06F 17/27 704/275 |

(Continued)

OTHER PUBLICATIONS

Jabaian, Bassam, Laurent Besacier, and Fabrice Lefèvre. "Investigating multiple approaches for slu portability to a new language." Eleventh Annual Conference of the International Speech Communication Association. 2010. (Year: 2010).*

(Continued)

*Primary Examiner* — Brian L Albertalli
(74) *Attorney, Agent, or Firm* — Shook, Hardy & Bacon, L.L.P.

(57) ABSTRACT

Systems, methods, and non-transitory computer-readable storage media are provided for crowdsourcing actions and commands of a digital assistant application, irrespective of the languages spoken by users of the digital assistant application. Techniques described herein enable the on-boarding of actions datasets, which include defined commands and actions that result therefrom, from client devices to a remote server device. More specifically, the described techniques facilitate the proper on-boarding, distribution, and retrieval of action datasets regardless of the command language employed by users of the digital assistant application to invoke a properly-determined corresponding action.

20 Claims, 7 Drawing Sheets

(56) References Cited

U.S. PATENT DOCUMENTS

| | | | | |
|---|---|---|---|---|
| 2014/0244254 A1* | 8/2014 | Ju | ............................ | G10L 15/22 |
| | | | | 704/243 |
| 2014/0278413 A1* | 9/2014 | Pitschel | ................ | G10L 15/063 |
| | | | | 704/243 |
| 2016/0019471 A1* | 1/2016 | Shin | ........................ | G06F 15/18 |
| | | | | 706/12 |
| 2016/0132482 A1* | 5/2016 | Salome | ............... | G06F 17/2735 |
| | | | | 704/9 |
| 2016/0179787 A1* | 6/2016 | Deleeuw | ............. | G06F 17/2785 |
| | | | | 704/9 |
| 2016/0225370 A1* | 8/2016 | Kannan | .................... | G10L 15/22 |
| 2017/0061956 A1* | 3/2017 | Sarikaya | ................ | G10L 15/005 |
| 2018/0144046 A1* | 5/2018 | Braga | ................ | G06F 17/30654 |

OTHER PUBLICATIONS

Su, Yu, et al. "Building natural language interfaces to web "&apis;Proceedings of the 2017 ACM on Conference on Information and Knowledge Management. ACM, 2017. (Year: 2017).*

Campagna, Giovanni, et al. "Almond: The architecture of an open, crowdsourced, privacy-preserving, programmable virtual assistant." Proceedings of the 26th International Conference on World Wide Web. International World Wide Web Conferences Steering Committee, 2017. (Year: 2017).*

Chowdhury, Shannnnur Absar, et al. "Cross-language transfer of semantic annotation via targeted crowdsourcing." Fifteenth Annual Conference of the International Speech Communication Association. 2014. (Year: 2014).*

\* cited by examiner

LANGUAGE AGNOSTIC COMMAND-UNDERSTANDING DIGITAL ASSISTANT

CROSS-REFERENCE TO RELATED APPLICATIONS

This application is related by subject matter to U.S. patent application Ser. No. 15/984,122, titled "SYSTEM AND METHODS FOR CROWDSOURCED ACTIONS AND COMMANDS," and filed May 18, 2018, which is assigned or under obligation of assignment to the same entity as this application, the entire contents of the application being herein incorporated by reference. This application is also related by subject matter and claims priority to U.S. Provisional Patent Application No. 62/611,996, titled "USING TRANSLATION TO MATCH COMMANDS IN DIFFERENT LANGUAGES," and filed Dec. 29, 2017, which is assigned or under obligation of assignment to the same entity as this application, the entire contents of the application being herein incorporated by reference.

BACKGROUND

Digital assistants have become ubiquitous in a variety of consumer electronic devices. Modern day digital assistants employ speech recognition technologies to provide a conversational interface between users and electronic devices. These digital assistants can employ various algorithms, such as natural language processing, to improve the interpretation of commands (e.g., requests for specific actions to be performed and/or for specific information to be provided) received from a user. Consumers have expressed various frustrations with conventional digital assistants due to, for instance, privacy concerns, frequent misinterpretations of spoken commands, unavailability of services due to weak signals or a lack of signal, and the general requirement that the consumer must structure their spoken commands in a language and/or parlance that is uncomfortable or unnatural for them. Further, the actions resulting from these commands in existing digital assistants typically do not execute within applications already available on users' mobile devices, which often is what users would like, particularly when they are on the move.

Moreover, as the general pace of society continues to accelerate, so do users' desires to consume readily-available information. Digital assistants can enable a seamless interface between users and their devices, and can provide a much faster means for the exchange of input and output information. One digital assistant, particularly the "Q" digital assistant developed by Aiqudo Inc., headquartered in San Jose, Calif., provides such a seamless interface. In other words, the "Q" digital assistant can, among many other things, perform a series of custom and predefined tasks (e.g., each series of tasks or operations representing an "action") based on a received command to accomplish a desired result.

SUMMARY

This Summary is provided to introduce a selection of concepts in a simplified form that further are described below in the Detailed Description. This Summary is not intended to identify key features or essential features of the claimed subject matter, nor is it intended to be used as an aid in determining the scope of the claimed subject matter.

Embodiments described in the present disclosure generally are directed towards techniques relating to a crowdsourced digital assistant for computing devices, particularly devices that are on the person of a user when the user is on the move (e.g., cell phones, connected watches, devices tethered to cars, etc.). In particular, embodiments facilitate an automatic distribution of actions (expressed as "action datasets"), as well as commands associated with such actions (expressed as "command representations"), such that the actions can be invoked, irrespective of the language and/or dialect in which such commands are provided or received. In this way, a digital assistant is provided that can perform any action on a computing device, limited only by the functionality of the computing device and its applications installed thereon.

In reference to systems such as the "Q Assistant," developed by Aiqudo, Inc. of San Jose, Calif., action datasets can be generated via a digital assistant executing on a computing device. Such action datasets can be generated by creating a file or dataset (e.g., an "action dataset") that references a series of events that typically is engaged in by a user of a computing device (e.g., a mobile computing device) when manually invoking the desired action via an application installed on the device. In some implementations, the series of events can be performed (e.g., by a user) and recorded by the digital assistant. That is, once recording begins, a user simply can perform the desired series of events or operations (e.g., manual inputs) within the application to achieve the desired result. The recorded series of events, once completed by the user, embodies the action and can be associated with one or more command representations (e.g., the corresponding commands being provided as one or more character strings and/or verbally input), provided in the user's natural language and/or dialect, that the user typically would announce to the digital assistant when invocation of the action is desired. In some aspects, customizable parameters (e.g., form fields, dropdown lists, dynamic fields) can be defined by the user after completing the recorded series of events. In this way, portion(s) of a command representation can be defined as a parameter field, so that the digital assistant can extract parameter(s) from the corresponding portion(s) and make appropriate inputs or selections based on the defined parameter.

After one or more action datasets are generated and stored in memory, upon receipt of a command representation or, in other words, upon receipt of an instruction to perform a particular action in response to a received command, the digital assistant can search for an action dataset that corresponds to the received command. In some embodiments, the digital assistant can search in a local memory (e.g., cache) or action dataset repository for an action dataset having a command representation that corresponds to the received command. In some further embodiments, the digital assistant can generate a query including the received command representation (e.g., the text corresponding to the command) for communication to a remote server. The remote server can thus be queried to retrieve a corresponding action dataset. Such an implementation can occur for each received command, or some received commands (e.g., when the command is determined not to correspond to an action dataset stored in local memory). The digital assistant may send the command representation to the remote server configured to determine one or more relevant action datasets to communicate back to the mobile device, so that a corresponding action can be performed thereon. Further detail regarding the generation or retrieval of action datasets can be found in U.S. Provisional Patent Application Nos. 62/508,181, 65/576,800, and 62/613,165, each of where are incorporated by reference herein.

The action dataset generated by a client device can include, at least, the series of events, information identifying the invoking application, one or more command templates that each includes a corresponding command representation with parameter fields (if applicable), among other things. In some aspects, each generated action dataset can include a unique action signature or identifier that corresponds to any combination of the foregoing, such as the application, version, events, templates, parameters, and the like. The action dataset is representative of the desired action that can be invoked upon a user simply announcing to the digital assistant, in the user's natural language and/or dialect, a command corresponding to one of the command templates (e.g., a command that is similar to one of the command representations) associated with the action.

In some embodiments, to facilitate automatic distribution of action datasets created by a number of users executing (or capable of executing) an instance of the digital assistant, generated action datasets can be communicated to a central computing device for storage and subsequent retrieval or distribution. For instance, action datasets can be communicated to one or more servers associated with the provider of the digital assistant.

In a preferred embodiment, each action dataset stored on the remote server includes data (e.g., command template) in a core language. That is, a primary language such as English, may be defined as a core language for the remote server system so that at a minimum, each action dataset must include at least one command representation in the core language. It is contemplated, however, that any core language may be defined for the remote server system, and that in some implementations, a core language may not be a strict requirement. For purposes of the present disclosure, however, the core language requirement will facilitate translation of any received command representation to the core language for ultimate determination of the corresponding command template and thus, the corresponding action dataset.

While commands associated with a series of events embodying an action can be provided in any language and/or dialect that is natural to the action-creating user, in order for an action dataset to be useful to a user of another computing device, such action dataset should be retrievable when the associated command representations are provided in a language and/or dialect that is natural to the user of the receiving computing device. As such, it would be ideal to define a mapping between command templates of other languages to command templates of the core language. In this regard, embodiments described herein can facilitate the generation of foreign language command templates and/or translated command templates (e.g., foreign language command templates translated to the core language), to be mapped to or from the core language command template corresponding to an action dataset.

In embodiments, the central computing device can distribute one or more action datasets to a plurality of other computing devices having an instance of the digital assistant executing (or available for execution) thereon. In this way, each user of the plurality of computing devices simply can announce (e.g., via input of one or more character strings or spoken data) a command corresponding to one of the command templates associated with the action (or a similar command) to perform the exact same series of events and achieve the desired result. In other words, provided that a new user (that is, a user other than the user that created the action dataset) has the application corresponding to the new action dataset executing (or available for execution) on his or her computing device, without configuration or additional interaction with the digital assistant, the new user simply can announce (e.g., via character string(s) or spoken data) a command corresponding to one of the command templates associated with the action to achieve the desired result.

In some embodiments, the foregoing process is performed without querying the central computing device if, for example, the action dataset is stored on the client computing device and the received command is in the core language corresponding to a command template of the stored action dataset. However, in instances where the received command is in another language (e.g., a foreign language), additional processing may be required to map the received command to an appropriate action dataset.

In embodiments, a command announced by a user can be received (as a command representation) by the central computing device in a wide variety of languages and/or dialects. As such, in some embodiments, the central computing device, upon receipt of a command representation in a language/dialect other than the core language/dialect, can, at a high level, employ automated translation services to translate the received command representation into the core language, retrieve query search results of the translated command representation, and identify a most-relevant action dataset to ultimately map the received command representation to. While the focus of the present disclosure is generally directed to the translation feature of the digital assistant application, the most-relevant action dataset can be identified with the technology disclosed in U.S. Provisional Patent Applications 65/576,800, titled "A Crowdsourced Digital Assistant Server and Methods," filed Oct. 25, 2017, and 62/580,444, titled "Automated Method to Create Discourses from User Commands," and filed Nov. 1, 2017, which are herein incorporated by reference in their entirety.

In this way, the command representation, though received in a foreign language, can still be employed to identify the correct action dataset and therefore, invoke the appropriate operations on the user's client device via the digital assistant application. In other words, appropriate action datasets can be provided to the user of the device from which the command representation was received in his or her natural language/dialect, allowing users that are comfortable with any one or more of a wide variety of languages/dialects to benefit from action datasets created by users naturally speaking languages/dialects other than the receiving user's language/dialect. In embodiments, translations may be performed by the central computing device or a translation service (e.g., a third-party application, a third-party website). It is contemplated that in some other embodiments, the user's client device may also include a translation application that translates the received command into the defined core language/dialect before the command representation thereof is communicated to the central computing device.

In accordance with embodiments described herein, the described digital assistant and corresponding system provide an ever-growing and customizable dialect that enables the digital assistant to learn from its users, in contrast to the frustrating and limited interpretation features provided by conventional digital assistants. Further, only a single language or dialect is necessary (e.g., the core language) to build an action dataset library, which facilitates an optimal solution to provide a worldwide language-capable digital assistant without the need for deciphering multiple language libraries. In turn, storage space can be significantly reduced, and significant resource consumption (e.g., processing, energy, memory, bandwidth) can be offloaded to third-party search engines or repositories. The described embodiments provide an optimal solution for enabling a digital assistant to understand and invoke operations in nearly any language with minimal resource consumption. In sum, strategic translation of commands (as command representations) and the generation of translated command templates can reduce redundancies in translation and the overhead (e.g., time, cost, and the like) associated with such translations, while permitting users comfortable with various languages and/or dialects to benefit from the crowd-sourced functionality provided.

BRIEF DESCRIPTION OF THE DRAWINGS

The present disclosure is described in detail below with reference to the attached drawing figures, wherein.

DETAILED DESCRIPTION

Figure 1:
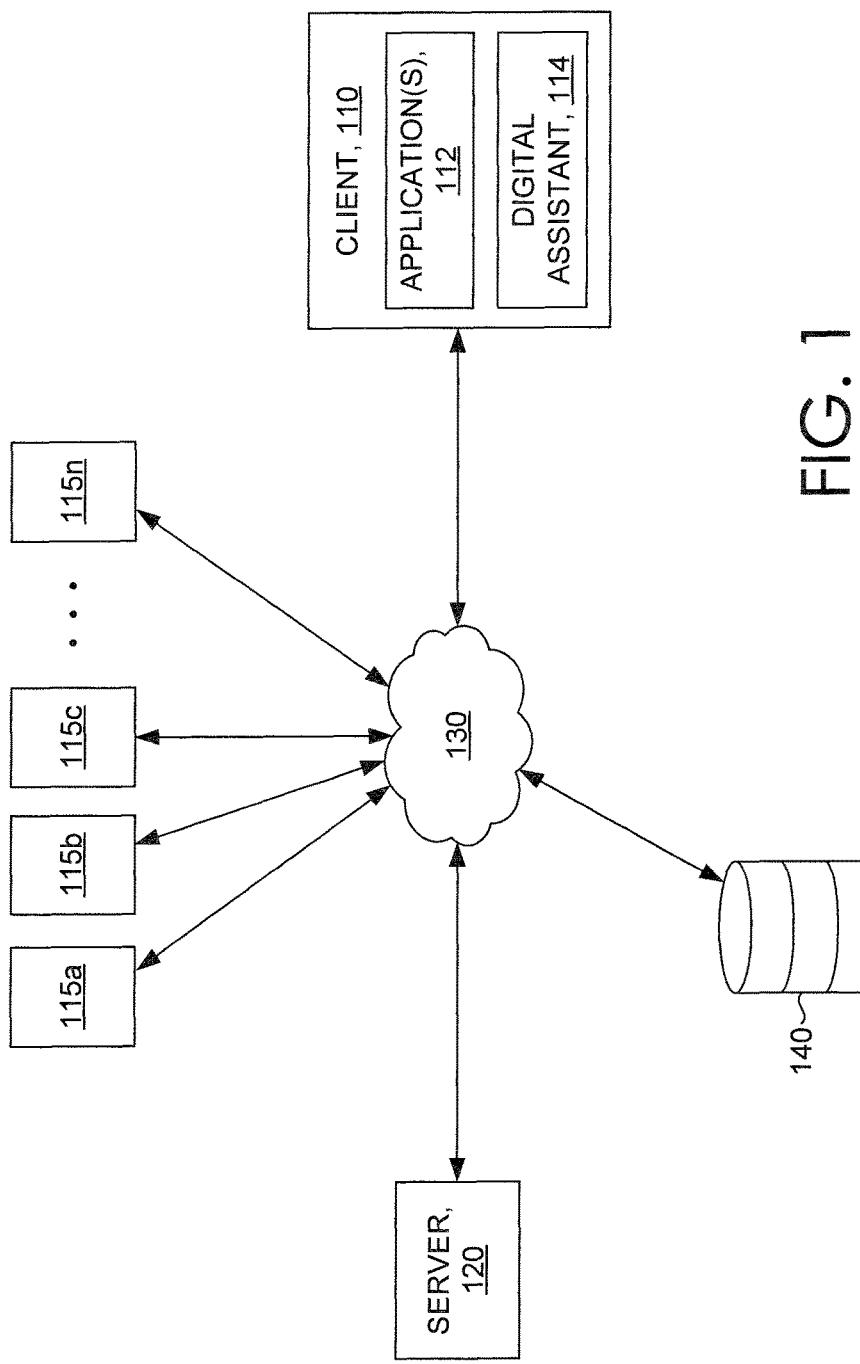
FIG. 1 depicts an exemplary operating environment suitable for use in implementing some embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein generally are directed towards crowdsourcing digital assistant actions and commands to enable the generation, storage, mapping, distribution, and instant invocation of actions across all users of a digital assistant application, irrespective of each individual user's natural language and/or dialect in which the commands are spoken.

As electronic devices become more integrated into our daily lives, so do the methods in which we can interface with them. Digital assistants have found a place in many peoples' homes, providing voice-activated services that can assist users with various tasks, from a basic level to a very advanced level. However, conventional digital assistants are mostly limited to the capabilities that the service provider and their developers implement. Some service providers and developers provide an open interface (e.g., an API) such that third-parties can develop custom services that can essentially "plug in" to the digital assistant and provide additional services. In this regard, users are generally at the mercy of these developers and must adapt to the specific commands programmed into these digital assistants.

For the most part, modern-day society has adopted the use of mobile computing devices, such as smart phones. Users generally prefer to carry portable computing devices on their person, having a readily-available resource for accessing information and providing a means for communication. Users can download and install applications of their choosing, and maintain settings that are customized to their personal preferences. The number of applications providing unique services to users is astounding, increasing by the thousands daily. In this regard, it is improbable to provide digital assistant services that can cater to the needs of all users, particularly based on the various services provided by the applications preferred and utilized by the users. Moreover, it is impractical to provide digital assistant services that can cater to the natural dialect of these users.

As such, a digital assistant having easily customizable commands and actions that can be performed by the digital assistant, based on the receipt of a command in a variety of languages and/or dialects, alleviates the aforementioned issues. That is, by providing the power of intuitive command and action on-boarding to the users, each user can provide unique commands that may be natural for only a very small percentage of their peers. Yet, a digital assistant having the ability to understand the requirements and needs of such users can be groundbreaking. As briefly noted above, the "Q" digital assistant, developed by Aiqudo, Inc., headquartered in San Jose, Calif., has implemented customizable automation into the digital assistant. In other words, the "Q" digital assistant can, among many other things, perform a series of predefined tasks (e.g., "actions") based on the receipt of an input (e.g., a "command") to accomplish a desired result. In addition, the "Q" digital assistant provides a plethora of additional services, such as crowd-sourced definitions of various commands and actions that are quality-assured by intelligent algorithms, essentially eliminating the need for a novice user to "train" their digital assistant to work with their preferred applications.

Among other things, the "Q" digital assistant is configured to receive a voice command and translate the spoken command to text such that the command is expressed as a command representation. The digital assistant may, in some embodiments, employ services local to the user device (e.g., speech to text engine) to facilitate the conversion to text. The digital assistant then can employ natural language processing to analyze the text for any recognized command templates stored thereon, that may be serviced by applications already-installed or required-to-be-installed by the user. In some instances, the commands may include parameters (e.g., variables) that are recognized by the digital assistant as well. In other words, a command can, in some instances, require a parameter to invoke the action and achieve a specific result that is based on the provided parameter. In some aspects, the digital assistant can facilitate the inclusion of one or more parameters into the commands associated with an action. In some further aspects, the digital assistant can intuitively provide the user with one or more datatypes for association with a required parameter. By way of example, an announced command to "show me a map," may cause the digital assistant to invoke a map or navigation application on the computing device. However, an announced command of "give me directions," may require one or more parameters that each corresponds to a starting point, destination, or both. In this regard, and by way of a non-limiting example, a "give me directions" command associated with the navigation application may require the user to announce a location parameter in addition to the command, such as "give me directions to San Jose." In another non-limiting example, another "give me directions" command associated with the navigation application may require the user to announce both the starting location parameter and the destination location parameter in addition to the command, such as "give me directions from Oakland Arena to San Jose." In some aspects, the server can employ machine learning technology, among other things, to determine a plurality of variations of the command with and/or without parameters, based on new command representations received by users of the digital assistant, available fields of the associated application, similar applications and/or commands, and the like.

The text of the command representation can be analyzed to determine whether any command templates (with or without parameters), which may be serviced by applications already-installed or required-to-be-installed by the user, correspond thereto. Provided that an application capable to service the command is installed (or subsequently installed) on the user device, the "Q" assistant then can automate a series of predefined tasks, which can include, by way of example only: launching the application, emulating touch inputs for button presses or application navigation, passing parameters into application form fields, waiting for application or remotely-communicated responses, and many more, until the automated "action" is fully executed and the user is provided with a result of the provided command.

As described, when the automated action is being executed by the digital assistant, or in other words, when the various steps associated with an automated action are being performed, the various steps required to complete the action are emulated by the digital assistant. In essence, and by way of example only, the user can provide a voice command to the digital assistant, such as "get me a ride to the airport," the digital assistant can determine that a particular application can provide this service, determine a current location of the user and a nearest airport, and launch a ridesharing application that the digital assistant can pass the "current location" and "airport" parameters to. Any additional inputs, such as selection of a "submit" button also can be automated by the digital assistant, provided that such tasks are included in the predefined action corresponding to the received command.

To facilitate the creation of new actions (e.g., one or more tasks, performance of which results in achievement of a desired result), action datasets can be generated, via a digital assistant executing on a computing device. In a preferred embodiment, action datasets are typically generated in a core language. However, such an implementation should not be limiting and it is understood that various languages may be employed, for instance, a language/dialect that is comfortable, familiar, and/or natural to the action-dataset-creating user. In accordance with embodiments described herein, a newly generated action dataset is representative of a desired action that can be invoked upon the creating user simply announcing or providing to the digital assistant, in their language and/or dialect, a command corresponding to one of the commands templates associated with the action.

To facilitate distribution of action datasets created by a number of users executing (or capable of executing) an instance of the digital assistant, action datasets can be communicated to a central computing device for storage and mapping to a searchable index, as will be described. While commands associated with a series of events embodying an action can be provided in any language and/or dialect that is natural to the action-creating user, it is contemplated that the action dataset should also be useful to a user of another computing device speaking in any other language and/or dialect. In this regard, embodiments described herein relate to techniques for on-boarding (e.g., receiving and storing) new action datasets in a foreign language and/or dialect other than the core language (herein also referred to as a "foreign language") and/or providing client devices with determined most relevant or appropriate action datasets in response to command representations received in a foreign language.

In some embodiments, command templates associated with an action dataset can be stored by a central computing device in a core language/dialect, such as English. The indexing of such command templates can be performed by the central computing device, so that when any one or more command representations are communicated thereto (e.g., by a digital assistant executing on a client device), one or more proper or most relevant action datasets can be identified and returned to the client device so that the corresponding tasks are performed thereon. In embodiments, the central computing device can distribute at least a portion of one or more action datasets to a plurality of other computing devices having an instance of the digital assistant executing (or available for execution) thereon. In this way, any user of the plurality of computing devices simply can announce (e.g., via input of one or more character strings or spoken data) a command corresponding to one of the command templates associated with the action to perform the exact same series of events and achieve the desired result on their device.

In embodiments, a command announced by a user of one of the plurality of other computing devices can be received in the form of a command representation (e.g., alphanumeric string) by the central computing device in any foreign language. As such, the central computing device, upon receipt of a command (as a command representation) in a language/dialect other than the core language/dialect, can translate the command representation into the core language (i.e., the primary language associated with the central computing device), and search an index of electronic documents that are each mapped to one of a plurality of stored action datasets, to identify and select at least one relevant action dataset. In this way, selected action datasets can be provided to the client device based on the command representation received. In some embodiments, the provided action dataset may include command template(s) transcribed in the language/dialect of the received command representation, enabling users comfortable only with their own language/dialect to benefit from actions created by users naturally speaking languages/dialects other than the receiving user's language/dialect. In some embodiments, it is not necessary to send the entire action dataset, but simply a portion of the appropriate action dataset, such as the corresponding set of input(s), which can be interpreted by the digital assistant to perform the desired tasks and achieve the desired result.

In some embodiments, methods, systems and non-transitory computer storage media are provided for on-boarding actions (e.g., creating or setting up new dynamic actions with or without parameters) and corresponding command templates via a digital assistant application executing (or available for execution) on a computing device. A "command template," as the term is utilized herein, is an alphanumeric representation of a command, or at least portions thereof, that is generally spoken or otherwise verbally provided. Command representations, the converted text representation of the command, are compared to command templates to identify corresponding actions.

An instruction to generate an action dataset can be received by a digital assistant executing on a client computing device. In some embodiments, the instruction specifies that the action dataset is to be associated with one of a plurality of applications installed on the computing device. The client computing device, by way of the digital assistant, detects a set of inputs that corresponds to the particular application and receives a set of command templates for association with the set of inputs. In some embodiments, a set of command representations is received in the language of the user (e.g., the action on-boarding user), who can also identify terms within each command representation that are required parameters to invoke the action, if applicable. In this way, command templates can be defined by the user. It is contemplated that command templates may or may not have parameters in accordance with embodiments described herein.

When the action dataset is generated by the client device, it is communicated from the digital assistant computing device to a server or "central computing device." The central computing device may, in various embodiments, store the action dataset and the set of command representations for future distribution. In some aspects, the action dataset can be augmented or modified with new command representations. For instance, additional command representations may later be added to the action dataset in situations where other users create the same action dataset with a different set of command templates. Additional features relating to the on-boarding of actions and the subsequent crowd-sourcing of such actions can be found in U.S. Provisional Patent Application 65/576,800, titled "A Crowdsourced Digital Assistant Server and Methods," filed Oct. 25, 2017, which is herein incorporated by reference in its entirety.

In situations when a client computing device executing the digital assistant does not recognize a command received from its user (e.g., no action datasets in local memory, unrecognized language, non-corresponding command representation), the digital assistant can communicate the command representation to the central computing device. The central computing device can then search the indexed electronic documents, each being mapped to one of a plurality of stored action datasets, to determine one or more most relevant action datasets. When one or more determined relevant action dataset is identified, the central computing device can communicate at least a portion of the one or more determined relevant action datasets to the computing device for storage thereon and/or performance of the corresponding tasks. In this regard, the central computing device can identify appropriate action(s) that correspond to the received command representation when the client computing device component of the digital assistant was unable able to.

There are, however, circumstances where a user creates a new action dataset having command templates transcribed in a foreign language. In this regard, the central computing device can retrieve a corpus of relevant electronic content (e.g., from the web or repository based on the command template) based on the command template and/or a translated core language version of the command template to facilitate a mapping of each piece of relevant electronic content to the to the new action dataset, as will be described. Embodiments herein describe techniques to facilitate the on-boarding of new action datasets generated with foreign language command templates, so that the new action datasets can be stored and associated with indexed pieces of relevant electronic content. In this regard, relevant action datasets can be identified and selected for distribution even when command representations in different languages are received from other client devices having the digital assistant executing thereon.

When the central computing device receives an action dataset, generated by a client computing device for on-boarding, the central computing device can determine that the command template(s) included therein are not transcribed in the core language. In some embodiments, it is desirable that each action dataset have a command template that is transcribed in the core language. That is, each action dataset stored on the central computing device can have at least one command template that is transcribed in the core language.

As such, when receiving a new action dataset having foreign language command templates, the central computing device can generate a query, including a foreign language command template, among other things, to search an electronic content repository for pieces of electronic content that are determined relevant based on the terms included in the foreign language command template. The retrieved pieces of electronic content, also transcribed in the foreign language, include terms that are determined by the electronic content repository as being relevant to the terms included in the command template. At this juncture, the central computing device can employ a translation service, either locally installed or accessible via a network, to receive from the translation service core language translated versions of both the command template and the retrieved pieces of electronic content for storage thereon. While it is understood that the translation service may make mistakes in the translation from the foreign language into the core language, embodiments described herein can compensate for such translational errors despite this apparent set-back, because both the command representation and the received electronic content will be similarly mistranslated by the translation service. As such, the positive correlation between both "mis"-translations (e.g., the command representation and the electronic content) will remain constant, as if they were both properly translated by the translation service.

The central computing device can define and maintain a logical mapping between the foreign language command templates and the core language translations thereof (the "core language command template") for future cross-referencing. Moreover, the central computing device can store the translated-to-core language pieces of electronic content, associating each piece with a tag or title corresponding to the translated-to-core language command template. The central computing device can begin generating a searchable index to facilitate a search through each piece of translated electronic content, with each piece of content being mapped to a corresponding core language command template (e.g., translated to the core language) and/or a corresponding foreign language command template, each command template being associated with one of the plurality of stored action datasets. In other words, the searchable index can store each piece of electronic content as a searchable record, and the searchable index can be employed to ultimately identify relevant action datasets.

In further embodiments, the central computing device may receive, from a digital assistant client device, a command representation transcribed in a foreign language. In other words, another user may wish to employ the digital assistant executing on their client device to invoke an operation of an application in response to a provided command. To this end, the provided command can be converted into alphanumeric text by the digital assistant, the command being transcribed in the user's native language, and communicated to the central computing device. As such, the central computing device may, in some embodiments, perform a comparison of the command representation to the command templates stored on the central computing device to determine whether there is a match. If a direct match is identified, any applicable parameters identified in the command representation can be extracted based on the parameter definitions in the matching command template, and the action dataset corresponding to the matching command template can be selected for distribution to the client computing device.

In some further embodiments, the digital assistant of the client device and/or the central computing device may be unable to immediately identify a direct match between the received command representation and a stored command template. As such, embodiments herein describe techniques to determine the appropriate or most relevant action dataset(s) when command representations are received transcribed in foreign languages. When the central computing device receives, from a digital assistant client device, a command representation in a foreign language, the central computing device can employ the translation service to translate the foreign language command representation into the core language. If the command representation is received in the core language, no translation is required. As referenced herein, once a foreign language command representation is translated, it can be referenced as a core language command representation. The core language command representation is again employed as a search query to determine whether any matching or relevant templates are stored on the central computing device. The core language command representation (and any determined relevant command templates) can then be employed, by the central computing device, to query the searchable index and determine the most relevant pieces of electronic content, each being mapped to a corresponding action dataset or the command templates thereof. In other words, terms included in the translated command representation are utilized to search the indexed pieces of electronic content to identify one or more pieces that are relevant to the search terms. In response to the query, the server can select one or more action datasets that are determined to be most relevant to the translated command representation.

In some embodiments, aspects of relevance can be determined based upon various types of contextual data obtained by the client computing device and communicated to the central computing device. For instance, client computing device location (e.g., GPS data), application usage history, applications installed thereon, recently-received commands, recently executed actions, recent contacts, browsing history, message history, and many more types of contextual data may be obtained and communicated as contextual data.

While various means for determining relevance generally known in the art may be employed, embodiments described herein employ search services to obtain electronic content relevant to a command representation and ultimately select relevant action datasets, details which are described in U.S. Provisional Patent Application 65/576,800, titled "A Crowdsourced Digital Assistant Server and Methods," filed Oct. 25, 2017, and U.S. Provisional Patent Application 62/611,996, titled "Personal Digital Assistant," filed Dec. 29, 2017, which are herein incorporated by reference in their entirety. Embodiments described herein are not necessarily limited to the aforementioned disclosure, and it is contemplated that other relevance determining technologies generally known in the art may be considered for implementation. For instance, neural networks may be trained and employed to determine relevance of electronic documents based on inputs (e.g., command representations and/or templates) received thereby.

When the most relevant action dataset(s) is determined and selected, the central computing device can send the determined most relevant action dataset(s) to the digital assistant computing device, so that the appropriate action is performed thereon or presented as a selectable option (e.g., if more than one action dataset is determined relevant). It is further contemplated that in some further embodiments, the foreign language command representation can also be incorporated (e.g., included) into the action dataset ultimately communicated back to the digital assistant computing device, for local storage and future recognition of the command at a later time. In such embodiments, it is contemplated that the digital assistant computing device can recognize the command in the user's preferred language without having to maintain a network connection to the central computing device. It is further contemplated that future modifications to the action dataset can be pushed from the central computing device to various client computing devices, or retrieved by various computing devices from the central computing device.

Turning now to FIG. 1, a schematic depiction is provided illustrating an exemplary system 100 in which some embodiments of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system in FIG. 1 includes one or more client computing devices 110, 115*a*, 115*b*, 115*c*, . . . 115*n*, in communication with a server 120 (e.g., a central computing device) via a network 130 (e.g., the Internet). In this example, the server 120, also in communication with the network 130, is in communication with each of the client computing devices 110, 115*a*, 115*b*, 115*c*, 115*n*, and also can be in communication with a database 140. The database can be directly coupled to the server 120 or coupled to the server 120 via the network 130. The client device 110, representative of client devices 115*a*, 115*b*, 115*c*, . . . 115*n*, is a computing device (e.g., for instance, computing device 600 illustrated in FIG.

6, more fully described below) comprising one or more applications 112 and having a digital assistant 114 installed thereon. The following description in reference to FIG. 1 provides a high level overview of the "Q" digital assistant, described briefly herein above, with additional detail provided in U.S. Provisional Patent Application No. 62/508, 108, filed May 18, 2017, entitled "SYSTEM AND METHODS FOR CROWDSOURCED ACTIONS AND COMMANDS," U.S. Provisional Patent Application No. 62/509,534, filed May 22, 2017, entitled "CONNECTING MULTIPLE MOBILE DEVICES TO A SMART HOME ASSISTANT ACCOUNT," U.S. Provisional Patent Application No. 62/539,866, filed Aug. 1, 2017, entitled "OPTIMIZING DISPLAY ENGAGEMENT IN ACTION AUTOMATION," U.S. Provisional Patent Application No. 62/576, 766, filed Oct. 25, 2017, entitled "A CROWDSOURCED DIGITAL ASSISTANT SYSTEM," U.S. Provisional Patent Application No. 62/580,444, filed Nov. 2, 2017, entitled "AUTOMATED METHOD TO CREATE DISCOURSES FROM USER COMMANDS, and U.S. Provisional Patent Application No. 62/611,996, filed Dec. 29, 2017, entitled "PERSONAL DIGITAL ASSISTANT."

The one or more applications 112 include any application that is executable on the client computing device 110, and can include applications installed via an application marketplace, custom applications, web applications, side-loaded applications, applications included in the operating system of the client computing device 110, or any other application that reasonably can be considered to fit the general definition of an application. On the other hand, the digital assistant 114 can be an application, a service accessible via an application installed on the client computing device 110 or via the network 130, or implemented into a layer of an operating system of the client computing device 110. In accordance with embodiments described herein, the digital assistant 114 provides an interface between the client computing device 110 and a user (not shown), generally via a speech-based exchange, although any other method of exchange between user and the client computing device 110 remains within the purview of the present disclosure.

When voice commands are received by the digital assistant 114, the digital assistant, the client computing device 110, or a speech engine installed thereon, can convert the speech command to text (creating command representation(s)). In some embodiments, the digital assistant can analyze the command representation by comparing it to command templates associated with action datasets stored in the client device. If a corresponding command template is found, then the corresponding series of inputs or operations included in the associated action dataset can be performed on one or more corresponding applications 112 installed on the client computing device 110.

By way of a brief overview, a command representation (embodying a command) can include one or more keywords and/or one or more parameters of a variety of defined parameter types, generally corresponding to a predefined action, or set of predefined actions, to be performed on one or more particular applications. Moreover, a plurality of command templates can correspond to a particular series of inputs and/or operations, such that there are multiple equivalent command representations that can invoke the same predefined action(s). By way of example only, commands such as "check in," check into flight," "please check in," "check into flight now," "check into flight 12345," and the like, all can invoke the same action(s) that directs the digital assistant to open an appropriate application and perform the predefined task(s) to achieve the same result.

The aforementioned commands, however, can lack appropriate information (e.g., the specific airline). As one of ordinary skill can appreciate, a user can have multiple applications from various vendors associated with a similar service (e.g., airlines). While not described in detail herein, the referenced "Q" digital assistant provides features that can determine contextual information associated with the user, based on historical use of the digital assistant, stored profile information, stored parameters from previous interactions or commands, and a variety of other types of information stored locally and/or on a remote computing device (e.g., the server 120), to identify an appropriate parameter and determine a complete command to invoke the appropriate action. More specific commands, such as "check into Friendly Airline flight," or "Friendly Airline check in," and the like, can be recognized by a digital assistant, such as the "Q" digital assistant, to invoke the appropriate action based on the complete command received thereby.

One or more action datasets, or modifications thereto, can be received by the digital assistant 114 from the server 120 at any time, including upon installation, initialization, or invocation of the digital assistant 114, after or upon receipt of a command representation by the digital assistant 114, after or upon installation of a new application, periodically (e.g., once per day), and/or when pushed to the client computing device 110 from the server 120, among many other configurations. It is contemplated that the action datasets received by the client computing device 110 are limited based, at least in part, on the applications 112 installed on the client computing device 110, although configurations where a larger or smaller set of action datasets can be received are contemplated to be within the scope of embodiments of the present disclosure.

If a particular application determined to correspond to a received command representation is determined not installed on the client computing device 110, the digital assistant 114 can redirect the user to a marketplace to install the appropriate application. In some further embodiments, the digital assistant 114 can include a training feature that enables a user to record manually performed tasks on one or more applications to achieve the desired result. The digital assistant 114 also can receive one or more commands from the user (e.g., via speech) to associate with the tasks manually performed or manually to be performed during training. In this way, the command (and/or its corresponding command template) is associated with at least the particular application designated by the user and also corresponds to the one or more tasks manually performed by the user, associating the received command template to the task(s) and the desired result.

In some instances, the server 120 can provide the digital assist 114 an action dataset for a received command representation based on crowd-sourced action datasets generated by (e.g., submitted by or received from) client devices 115*a*, 115*b*, 115*c*, . . . 115*n*, also independently having a digital assistant 114 and applications 112 installed thereon. The client devices 115*a*, 115*b*, 115*c*, . . . 115*n* can have any combination of applications 112 installed thereon, and any generation of action datasets performed on any client device 110, 115*a*, 115*b*, 115*c*, . . . 115*n* can be communicated to the server 120 to be analyzed, mapped, and stored for mass or selective distribution. Although not described in more detail herein, the server 120 can include various machine-learned algorithms to provide a level of quality assurance on any portion of user-generated action datasets and actions before they are distributed to other users via the network 130.

Figure 2:
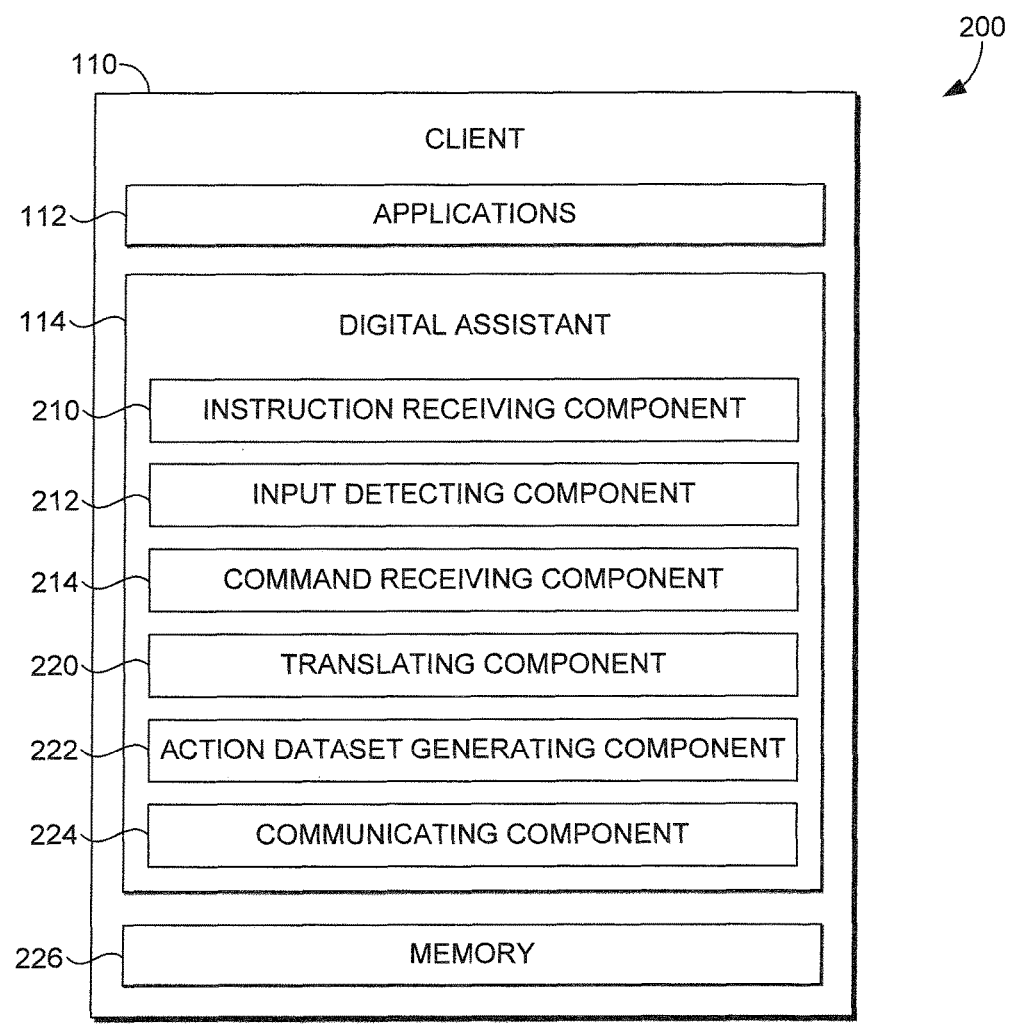
FIG. 2. is a block diagram illustrating an exemplary implementation of a client computing device having a digital assistant in accordance with some embodiments of the present disclosure.

Referring now to FIG. 2, a block diagram 200 is provided to illustrate an exemplary implementation of a client computing device 110 having one or more applications 112 installed thereon and a digital assistant 114, in accordance with some embodiments of the present disclosure. As noted herein, the client computing device 110 can include a memory 226 for storing, among other things, action datasets generated by the client device 110 and/or communicated from a server (e.g., the server 120 shown in FIGS. 1 and 3). The action datasets can include, by way of example only, one or more command templates having any number of defined parameters of any defined parameter type, one or more detected inputs or operations, and any additional electronic content associated with an action to be performed corresponding to an application executing (or available for execution) on the client computing device 110.

In some embodiments, stored action datasets can correspond to any collection (e.g., a popular or predefined set) of applications installed by a larger population of clients, such as clients 115a, 115b, 115c, . . . 115n of FIG. 1. In some aspects, the action datasets further can be limited based on versions of the application or the platform (e.g., operating system) on which the applications are executed. While storage of a larger dataset of action datasets of recognizable command templates and corresponding actions and/or other information is preferable for offline availability of the digital assistant 114, in some instances the memory 226 can only include a single action dataset or a small set of datasets corresponding to action datasets retrieved from a server (such as server 120 shown in FIG. 1), based on a command representation(s) previously or recently received by the digital assistant 114.

In some embodiments of the present disclosure, the digital assistant application 114 is configured to emulate (e.g., automatically perform, generate, or replicate) a set of inputs in response to a command received and determined to correspond to a command template stored on the client device 110 or server 120. To implement various embodiments described herein, the digital assistant 114 can include, among other things, an instruction receiving component 210, an application detecting component 212, a command receiving component 214, a querying component 216, a query result receiving component 218, a translating component 220, an action dataset generating component 222, and a communicating component 224. The described components are not intended to be limited to the specific structure, order, or devices described herein, and can be implemented in such ways where operations described therein can be swapped, intermixed, or modified to achieve the same or similar results described within the purview of the present disclosure.

The instruction receiving component 210 of the digital assistant 114 can receive an instruction to generate an action dataset associated with a particular application 112 executing (or available for execution) on the client computing device 110. In some embodiments, the particular application 112 is selected from a plurality of applications capable of being executed on the client computing device 110. The input detecting component 212 of the digital assistant 114 can detect a set of inputs that corresponds to the particular application 112 executing on the client computing device 110.

The command receiving component 214 of the digital assistant 114 can receive a set of command representations (each comprising an alphanumeric character string corresponding to one or more commands, each character string being received based upon at least one of detected audio data, speech data, input data, or network data). In some embodiments, a command representation can be determined to correspond to at least one command template (which may or may not include one or more parameters) associated with one or more action datasets having a set of inputs, tasks, or operations capable of being automatically performed by the digital assistant on the particular application 112. In an embodiment, a command representation is preferably received in a core language (e.g., a defined primary language of the central computing device) but can be received in any foreign language in accordance with various embodiments described herein.

The translating component 220 of the digital assistant 114 can translate, from a foreign language into a core language (e.g., a primary language associated with a provider of the digital assistant application), a received command or command representation. In some embodiments, the translating component can translate command representations from the core language to a foreign language. It is contemplated, however, that the translating component 220 is optional, and that command representations can be transcribed in the foreign language in which the command was received.

The action dataset generating component 222 of the digital assistant 114 can generate an action dataset based, at least in part, on the detected set of inputs and one or more command templates defined by the user of the computing device hosting the digital assistant 114. In embodiments, the action dataset includes an action (e.g., set of inputs, tasks, operations) to be performed by a particular application executing (or available for execution) on the client computing device 110. In some embodiments, the generated action dataset can be indexed locally for subsequent access by the user, or communicated to the central computing device for storage, mapping, and subsequent distribution to other client computing devices employing the digital assistant application, as more fully described herein.

The communicating component 224 of the digital assistant 114 can communicate at least a portion of the generated action dataset to a remote server 120 (e.g., a central computing device associated with a provider of the digital assistant application 114) for at least one of storage, mapping, and distribution to a plurality of client computing devices that each has the digital assistant application executing (or available for execution) thereon.

Figure 3:
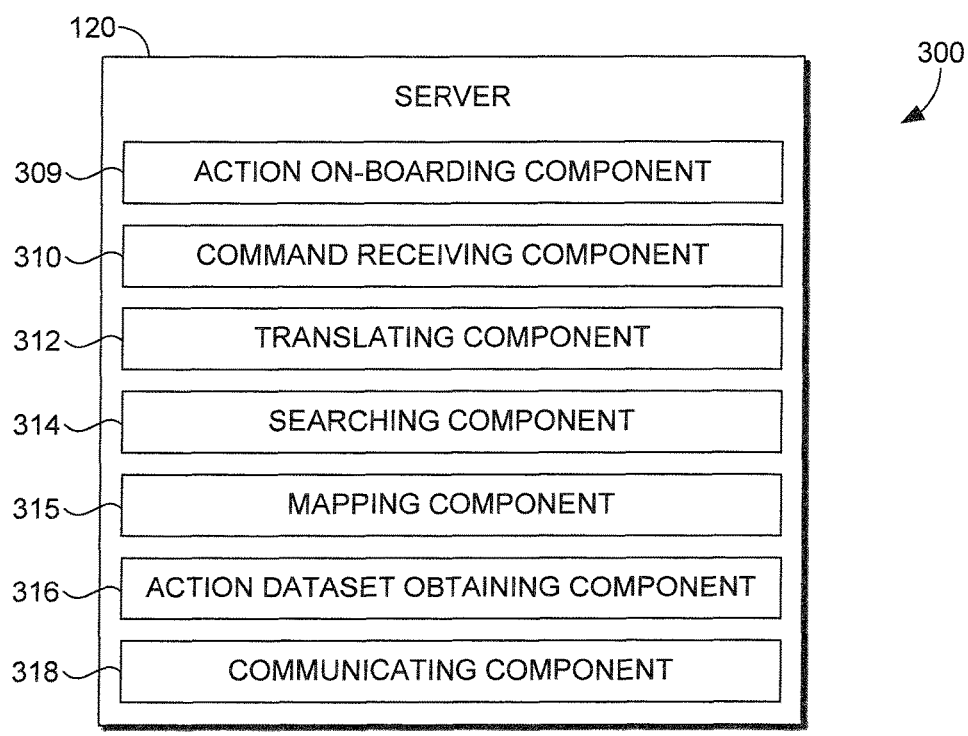
FIG. 3 is a block diagram illustrating an exemplary implementation of a central computing device (e.g., a server associated with a provider of a digital assistant) configured for storing, mapping, and distributing action datasets among a plurality of client computing devices in accordance with some embodiments of the present disclosure.

With reference now to FIG. 3, a block diagram 300 is provided to illustrate an exemplary implementation of a server (e.g., the server 120 of FIG. 1) in accordance with some embodiments of the present disclosure. To implement various embodiments described herein, the server 120 can include, among other things, an action on-boarding component 309, a command receiving component 310, a translating component 312, a searching component 314, a mapping component 315, an action dataset obtaining component 316, and a communicating component 320. The described components are not intended to be limited to the specific structure, order, or devices described herein, and can be implemented in such ways where operations described therein can be swapped, intermixed, or modified to achieve the same or similar results described within the purview of the present disclosure.

The action on-boarding component 309 of the server 120 can receive (herein also referred to as "on-board") one or more generated action datasets from a digital assistant application (e.g., the digital assistant application 114 shown in FIGS. 1 and 2) executing (or available for execution) on a remote client computing device (e.g., the client computing device 110 shown in FIGS. 1 and 2). The action on-boarding component 309 can receive the generated action dataset and determine, based on its action signature or identifier, whether a corresponding action dataset already exists on the central computing device. If a determination is made that the action dataset already exists, or at least a portion exists, then any difference between the action datasets (e.g., new command templates) are merged into or mapped to the stored action dataset. In this regard, if a new action dataset is received with command templates in a foreign language, and a corresponding action dataset only includes command templates in the core language, then the foreign language command templates may be merged or mapped to the stored action dataset. The command receiving component 310 of the server 120 can receive one or more command representations from a digital assistant application (e.g., the digital assistant application 114 shown in FIGS. 1 and 2) executing (or available for execution) on a remote client computing device (e.g., the client computing device 110 shown in FIGS. 1 and 2). In some embodiments, the command representation(s) can be received in a foreign language (e.g., a language familiar and/or natural to a user associated with the digital assistant application 114 from whom the subject command representation is received). In this regard, the command receiving component 310 can receive command representations from a client computing device in any language, so that the server 120 can identify one or more relevant action datasets to distribute back to the client device, to invoke an appropriate action locally on the client computing device, by way of the digital assistant application executing thereon.

The translating component 312 can, in various embodiments, translate terms transcribed in command templates, command representations, and/or any other pieces of electronic content transcribed in a foreign language, into a defined core language (e.g., a primary language associated with a provider of a digital assistant application) or vice versa. In some embodiments, the translating component 312 can translate pieces of electronic content retrieved from an electronic resource, such as a searchable electronic document repository. As described herein, the translating component 312 can include, among other things, a translation service that is remotely or locally accessible to the central computing device. The translation service can include installed applications or $3^{rd}$-party application services, such as an application programming interface (API) accessible to the central computing device.

In some aspects, the translating component 312 can translate command templates in the foreign language to the core language, to generate additional core language command templates that can also be merged or mapped to a stored action dataset, such that additional searchable content is available when additional command representations in foreign languages are subsequently received, as will be described.

Searching component 314 can be employed to retrieve pieces of electronic content that are determined relevant to the foreign language terms included in a foreign language command template. The foreign language terms of a foreign language command template can be employed as the search query, so that the searching component 314 can retrieve pieces of electronic content it determines as most relevant to the terms of the foreign language command template. The translating component 312 can then translate the retrieved pieces of electronic content and the foreign language command template into the core language for storage, and mapping by mapping component 315. The searching component 314 can also be employed to search a searchable index, including the retrieved pieces of electronic content or translated versions thereof. In some embodiments, the searching component 314 can be adapted to search anything stored on the server, such as command templates and the like.

The mapping component 315 can be employed to define logical relationships between various elements described herein. In some embodiments, each piece of the translated-to-core language electronic content may be tagged or modified, by mapping component 315, with a title that corresponds to the translated-to-core language command template. The mapping component 315 can further establish a logical relationship between the pieces of translated-to-core language electronic content to the translated-to-core language command template employed in the search and/or the corresponding foreign language command template. As the server 120 maps command templates to corresponding pieces of retrieved and translated electronic content, a searchable index is generated. As described herein, the searchable index can be employed (e.g., by searching component 314) to search terms included in a received command representation, translated to the core language, to determine most relevant pieces of electronic content and thus, most relevant command templates and/or action datasets corresponding to the most relevant pieces of electronic content.

Looking back at searching component 314, the searching component 314 can, in some embodiments, query the searchable index that includes the translated-to-core language pieces of electronic content. As was described, each translated-to-core piece of electronic content is associated with a corresponding command template, which is associated with a corresponding action dataset stored on the server.

In some embodiments, each action dataset has at least one command template transcribed in the core language, and can also include or be mapped to one or more command templates in one or more foreign languages. In some further embodiments, each action dataset can also correspond to or be mapped to translated-to-core language pieces of electronic content that are determined relevant to a corresponding command template of a set of command templates. In this regard, when a command representation is received by the central computing device, the searching component 314 can search the searchable index of electronic content to find at least one piece of relevant electronic content, which can include or reference any one of a set of command templates transcribed in any foreign language, a set of command templates transcribed in the core language, and/or at least one corresponding action dataset.

In some further embodiments, the searching component 314 can generate a search query that includes at least a portion of a translated-to-core language command representation. In some embodiments, the searching component 314 can search the searchable index (including the pieces of translated-to-core language electronic content) to identify at least one piece that is determined most relevant to the translated-to-core language command representation. The searching component 314 can then identify any command templates mapped to the determined most relevant piece(s) of electronic content. In this regard, in some embodiments, if a foreign language command template exists, it can be employed to extract any defined parameters from the received foreign language command representation. In some other embodiments, the core language command template can be employed to extract any defined parameters from the translated-to-core language command representation. It is contemplated that parameter extraction can occur in various portions of the processes described herein. For instance, parameter extraction can occur when relevance of the pieces of electronic content is determined, or when action datasets are selected and ranked for relevance to the received command representation, among other things.

In some embodiments, the searching component 314 may determine that there are no foreign language command templates that correspond to the received foreign language command representation to identify a direct match. In this regard, the searching component 314 can employ the translating component 312 to translate the received foreign language command representation to the core language. In other embodiments, the translating component 312 can be employed to translate every foreign language command representation received. Once the translated core language command representation is obtained from the translating component 312, the searching component 314 can again search the locally stored command templates to determine whether any core language command templates corresponds to the translated core language command representation. The translated core language command representation and any determined matching or relevant stored command templates are then employed as search parameters to determine whether any pieces of electronic content can be determined most relevant to the translated core language command representation and any other determined relevant/matching command templates. The searching of the pieces of electronic content can employ any of the relevance determining technologies described or referenced herein. Given at least one piece of determined relevant electronic content as a search result, a corresponding command template (and thus, an action dataset) can be identified based at least in part on its defined mapping to the relevant electronic content. As such, an appropriate action dataset can be selected accordingly to invoke the action on the client device.

The mapping component 315 of the server 120 can define relationships between any action dataset, core language command template, foreign language command template, and/or set of electronic content pieces. That is, any of the foregoing can be mapped together in an index that is searchable, so that if any of the pieces of electronic content are determined to have a high correlation or relevance to the search term(s) (e.g., the command representation), then the mapped action dataset, core language command template, and/or foreign language command template can be determined as relevant electronic content piece(s).

The action dataset obtaining component 316 can select one or more action datasets from the plurality of stored action datasets that are associated with the piece(s) of electronic content determined to be the most relevant to a translated command representation. In some embodiments, relevance can be determined based upon various types of contextual data obtained by the computing device, including any portion of the received command representation, among other things. While various means for ranking and selecting most relevant search results may be employed, embodiments described herein can employ search services to obtain electronic content relevant to a command representation and ultimately select relevant action datasets. One possible implementation includes details described in U.S. Provisional Patent Application 65/576,800, titled "A Crowd-sourced Digital Assistant Server and Methods," filed Oct. 25, 2017, which is herein incorporated by reference in its entirety. The communicating component 318 can communicate at least one selected action dataset or a portion thereof to a remote client computing device (e.g., the remote client computing device 110 shown in FIGS. 1 and 2) based on the determination that the action dataset is determined most relevant to the received command representation.

Figure 4:
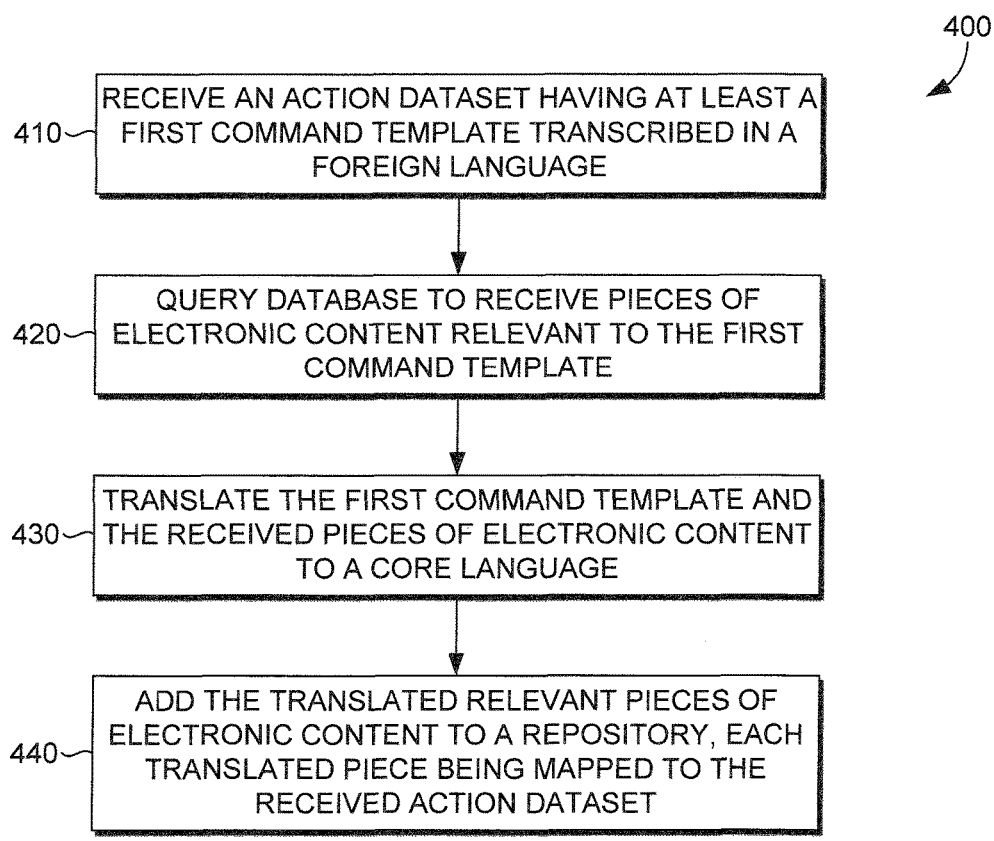
FIG. 4 is a flow diagram showing a method for on-boarding actions and corresponding commands (expressed as command representations), transcribed in foreign languages, to a digital assistant server in accordance with some embodiments of the present disclosure.

Turning now to FIG. 4, a flow diagram 400 is provided to illustrate a method for language agnostic selection and distribution of actions for a crowd-sourced digital assistant application (e.g., the digital assistant application 114 shown in FIGS. 1 and 2) executing on a computing device (e.g., the client computing device 110 shown in FIGS. 1 and 2) in accordance with embodiments of the present disclosure. As shown at block 410, an action dataset is received, by a central computing device (e.g., a server) and from digital assistant application executing on a client computing device. An action dataset can be generated by the client computing device, as described herein, which is associated with a particular application executing (or available for execution) on the client computing device. In embodiments, the particular application is selected from a plurality of applications capable of being executed on the client computing device. The action dataset can include, among other things, a unique action signature, a set of defined inputs or operations that can be emulated or performed by the digital assistant application, and one or more command templates that may or may not include one or more defined parameter fields. The command templates and optionally defined parameters correspond to natural language representations of commands (voice or data) that may be received, by the digital assistant, in a native language (i.e., a foreign language) of a user of the device.

Responsive to a determination that a received command corresponds to the command template, the digital assistant application can automatically invoke or emulate the corresponding set of inputs. In some embodiments, the central computing device can provide an indexing service that stores, among other things, action datasets generated by a plurality of user devices having the digital assistant application. A core language, such as English, can be defined as a primary language by the central computing device. The core language can be defined, such that each action dataset "on-boarded" or communicated to the central computing device for storage thereon must have at least one core language command template included therein or mapped thereto. The mapping or inclusion of the at least one core language command template can be performed by the server device. For purposes of the present disclosure, a foreign language is different than the defined core language.

As shown at block 420, server device can search the Internet or a database, such as a third-party electronic content repository, for pieces of electronic content that are relevant to a command template transcribed in the foreign language and included in the received action dataset. That is, the performed search will employ the terms included in the command template to search the database for pieces of electronic content also transcribed in the same foreign language.

As shown at block 430, the server device can translate at least each of the command template and the received relevant pieces of electronic content into the core language, in essence, generating a translated command template and translated relevant pieces of electronic content.

As shown at block 440, the server device can add the translated relevant pieces of electronic content to a repository that can store and index the translated relevant pieces of electronic content, each being mapped to the received action dataset, among other things. In other words, each translated relevant piece of electronic content is mapped to at least the translated command template, which can also be mapped to the command template transcribed in the foreign language.

Because the foreign language command template included defined parameters, if any at all, the defined parameters present in the translated command template can be identified and extracted so that the translated command template also has defined parameter fields that correspond to the parameter fields defined in the command template transcribed in the foreign language.

Although not shown in FIG. 4, the server device can subsequently receive a command representation, from any other client device having the digital assistant executing therein, also transcribed in the foreign language. The server device can search the indexed repository to determine whether a foreign language command template is stored therein or mapped to any of the core language command templates, so that an appropriate action dataset can be selected for communication thereto. The server device can further translate the foreign language command representation to the core language, prior to searching the command templates and the pieces of electronic content in the indexed repository. In this regard, the server device can determine, based on the search results, whether a translated or core language command template stored therein is relevant to the translated command representation, so that an appropriate action dataset can be selected for communication to the client device. It is contemplated that various ranking and relevance determining algorithms may be employed to select a most relevant action dataset, though a preferred embodiment employs other techniques incorporated by reference herein.

Figure 5:
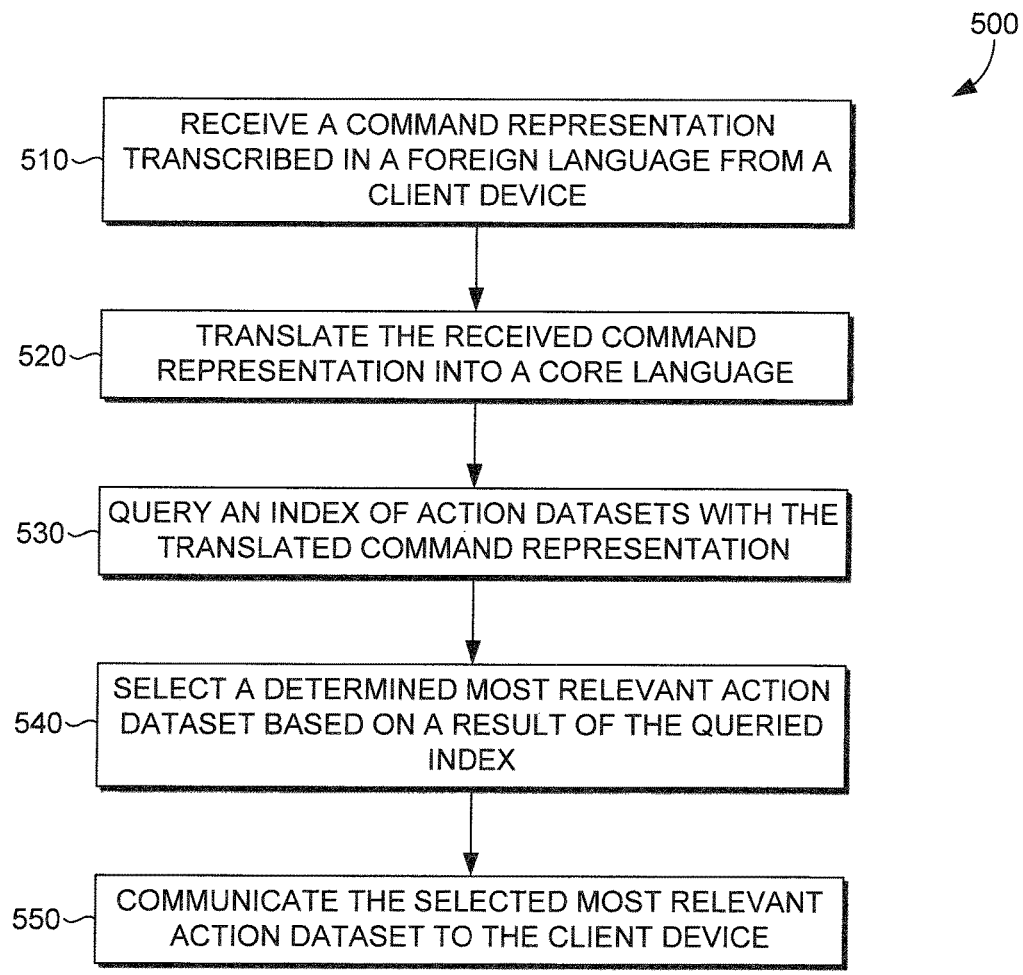
FIG. 5 is a flow diagram showing a method for communicating relevant action datasets based upon commands (expressed as command representations) received in a foreign language/dialect in accordance with some embodiments of the present disclosure.

With reference now to FIG. 5, a flow diagram 500 is provided to illustrate an exemplary method for communicating action datasets indexed in a core language (e.g., a primary language of a provider of a digital assistant application, such as the digital assistant application 114 illustrated in FIGS. 1 and 2) based upon commands received in a foreign language (e.g., a language that is familiar, natural and/or comfortable to a user from which a command is received), in accordance with some embodiments of the present disclosure. As shown at block 510, a server (e.g., a central computing device or server associated with the provider of a digital assistant application, such as the digital assistant application 114 illustrated in FIGS. 1 and 2) receives a command representation from a digital assistant application executing (or available for execution) on a remote client computing device (e.g., the client computing device 110 illustrated in FIGS. 1 and 2). The command representation corresponds to a command received from a user of the remote client computing device (e.g., as one or more character strings or spoken input) and is received in the foreign language.

As shown at block 520, the server translates the received command representation into the defined core language. In the core language, as shown at block 530, the server queries a plurality of indexed action datasets. In embodiments, the plurality of action datasets is indexed in the core language and each action dataset queried includes, at least, a set of command representations and a set of inputs corresponding to an application executing (or available for execution) on the remote client device. In further embodiments, the indexed plurality of action datasets also includes pieces of electronic documents that were retrieved and translated by the server, each piece being mapped or tagged to correspond to one of the indexed action datasets.

As shown at block 540, one or more action datasets are selected, by the server, from the plurality of indexed action datasets. The one or more selected action datasets are those action datasets determined to be most relevant to the translated command representation. In some embodiments, relevance can be determined based upon any one of the ranking and relevance algorithms described herein and/or various types of contextual data obtained by the computing device, including any portion of the received command representation, among other things. As shown at block 550, the server communicates at least one action dataset determined to be most relevant to the translated command representation to the remote client computing device. Although not shown, the client device can be configured to receive a determined most relevant action dataset, with parameters identified from the command representation sent to the server device, to invoke the set of inputs or events corresponding thereto.

Figure 6:
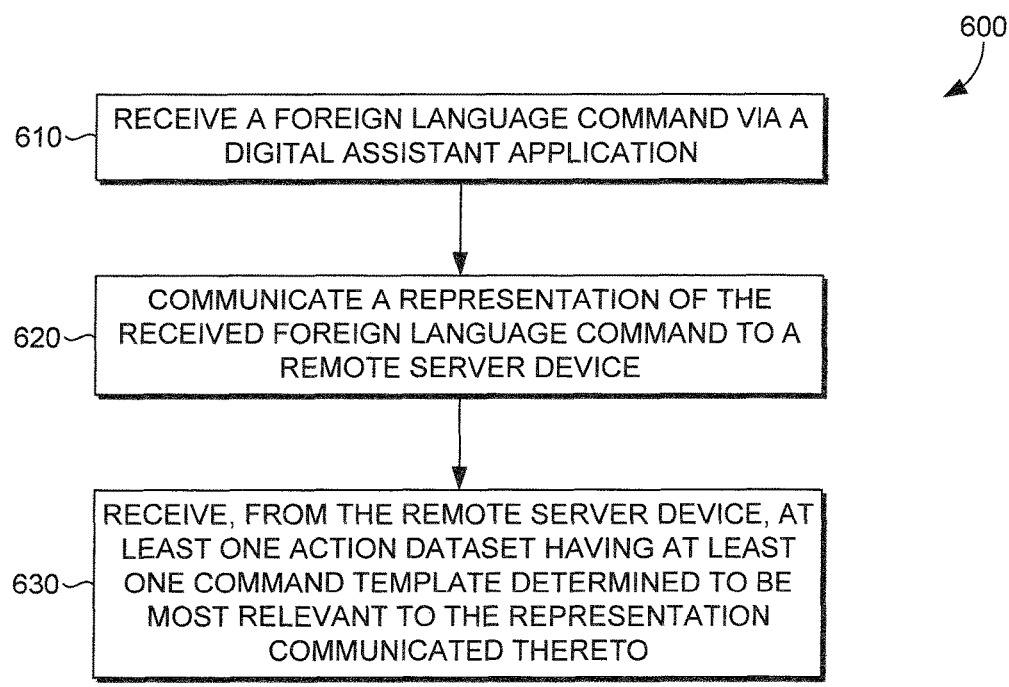
FIG. 6 is a flow diagram showing a method for receiving relevant action datasets based upon commands (expressed as command representations) received in a foreign language/dialect in accordance with some embodiments of the present disclosure.

Turning now to FIG. 6, a flow diagram 600 is provided to illustrate a method for receiving action datasets based upon command representations received in a foreign language (e.g., a language that is familiar, comfortable, and/or natural to a user providing a command representation). As illustrated at block 610, a digital assistant application (e.g., the digital assistant application 114 shown in FIGS. 1 and 2) executing (or available for execution) on a client computing device (e.g., the client computing device 110 shown in FIGS. 1 and 2) receives a command representation corresponding to a particular application executing (or capable of being executed) on the client computing device. The command representation is received in the foreign language. The command representation can be converted from speech data received via a microphone, via a network connection, or can correspond to input data received via the client computing device or another device in communication with the client device via the network connection.

As shown at block 620, the digital assistant application communicates the command representation to a server (e.g., a central computing device associated with a provider of the digital assistant application, for instance, the server 120 shown in FIGS. 1 and 3), the server having a plurality of action datasets indexed in association therewith in a defined core language. For purposes of the present disclosure, it is contemplated that the defined core language is different than the foreign language. Each of the plurality of action datasets includes, at least, an action signature, a set of inputs, and a set of corresponding command templates that may optionally include a set of defined parameters.

As shown at block 630, the digital assistant application receives, from the server, one or more action datasets from the plurality of indexed action datasets that is determined to be most relevant to the received command representation. As described herein, the server can receive the foreign language command representation, translate it to a core language command representation, and search the plurality of indexed action datasets for relevance. In further embodiments, the indexed action datasets each include a corresponding set of relevant electronic content pieces that were retrieved and translated by the server when the action dataset was on-boarded. In accordance with embodiments described herein, the relevant electronic content pieces were retrieved in the same foreign language as the foreign language command template, and subsequently translated to the core language for indexing.

In some embodiments, relevance can be determined based upon various ranking and relevance determining algorithms described herein, along with various types of contextual data obtained by the computing device, including any portion of the received command representation, among other things. In some embodiments, the one or more action datasets are received in the core language. However, it is further contemplated that a corresponding foreign language template be included in the action dataset communicated to the client device from the server, so that subsequent commands corresponding to the foreign language template and received by the client device can invoke the appropriate action dataset, even while network connectivity to the server is unavailable.

Having described various embodiments of the present disclosure, an exemplary operating environment in which embodiments of the disclosure can be implemented is described below in order to provide a general context for various aspects of the disclosure. Referring to the figures in general and initially to FIG. 7 in particular, an exemplary operating environment for implementing embodiments of the present disclosure is shown and designated generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one component nor any combination of components illustrated.

Embodiments of the disclosure may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the disclosure can be practiced in a variety of system configurations, including, but not limited to, hand-held devices, consumer electronics, general-purpose computers, more specialty computing devices, and the like. Embodiments of the disclosure also can be practiced in distributed computing environments where tasks are performed by remote-processing devices that are linked through a communications network.

Figure 7:
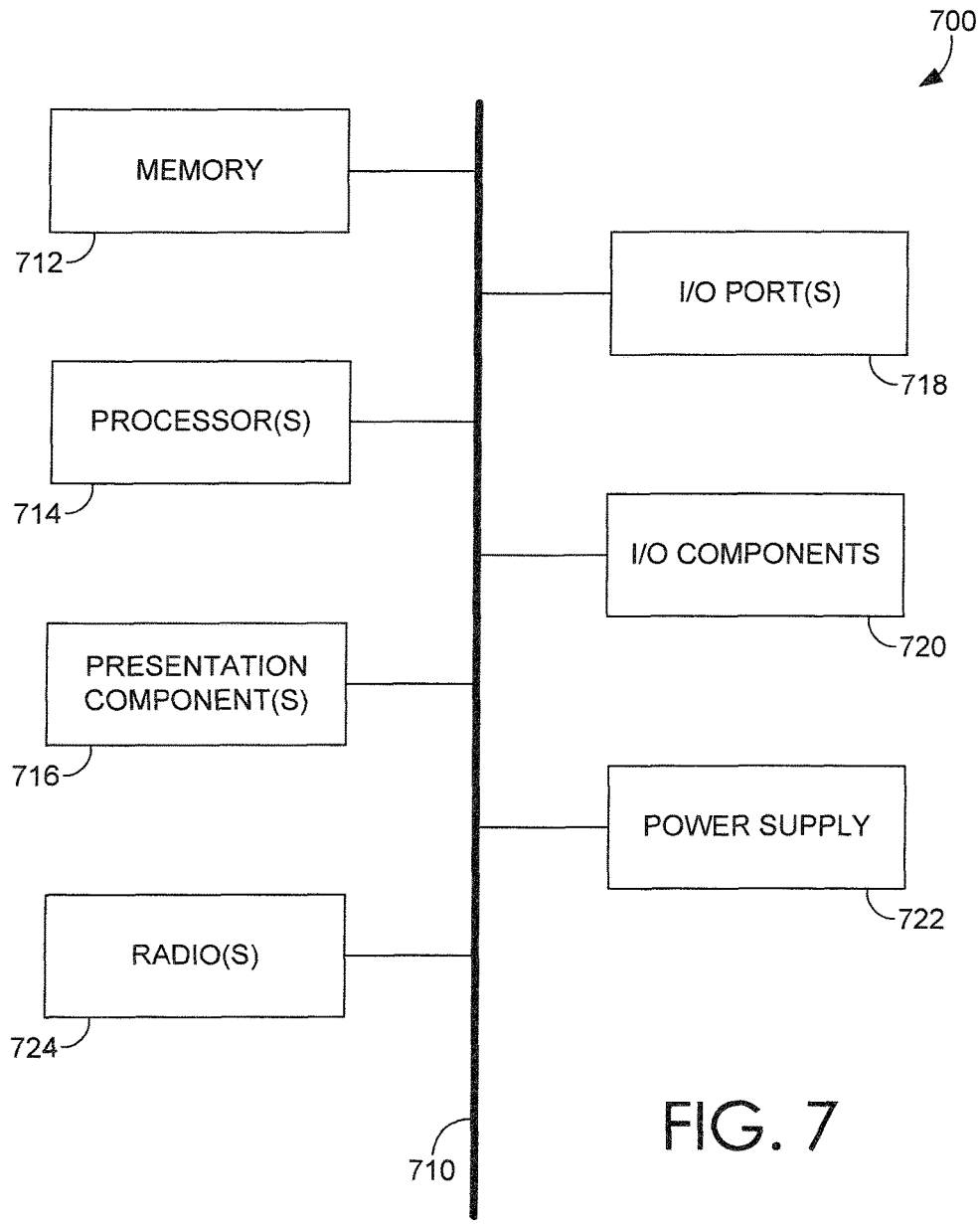
FIG. 7 is a block diagram of an exemplary computing environment suitable for use in implementing some embodiments of the present disclosure.

With continued reference to FIG. 7, the computing device 700 includes a bus 710 that directly or indirectly couples the following devices: a memory 712, one or more processors 714, one or more presentation components 716, one or more input/output (I/O) ports 718, one or more I/O components 720, and an illustrative power supply 722. The bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one can consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

The computing device 700 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 712 includes computer-storage media in the form of volatile and/or nonvolatile memory. The memory may be removable, non-removable, or a combination thereof. Exemplary hardware devices include solid-state memory, hard drives, optical-disc drives, and the like. The computing device 700 includes one or more processors that read data from various entities such as the memory 712 or the I/O components 720. The presentation component(s) 716 present data indications to a user or other device. Exemplary presentation components include a display device, speaker, printing component, vibrating component, and the like.

The I/O ports 718 allow the computing device 700 to be logically coupled to other devices including the I/O components 720, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 700. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein also can be practiced in distributed computing environments where tasks are performed by remote processing devices that are linked through a communications network. In a distributed computing environment, program modules can be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

As can be understood, embodiments of the present disclosure provide systems, methods, and computer-readable storage media for, among other things, crowdsourcing actions and commands to enable the generation, indexing, distribution, and instant use of action datasets and associated command representations across all users of a digital assistant, irrespective of each individual user's natural language and/or dialect. The present disclosure has been described in relation to particular embodiments, which are intended in all respects to be illustrative rather than restrictive. Alternative embodiments will become apparent to those of ordinary skill in the art to which the present disclosure pertains without departing from its scope.

While the disclosure is susceptible to various modifications and alternative constructions, certain illustrated embodiments thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A computer-implemented method for language agnostic maintenance of actions for a crowd-sourced digital assistant, the method comprising:
   receiving, by a server device, an action dataset generated by a remote client device having the crowd-sourced digital assistant executing thereon, the received action dataset referencing a corresponding set of inputs and including at least a corresponding command template transcribed in a foreign language;
   querying, by the server device in the foreign language, at least one of an Internet search engine and a third-party data repository for pieces of electronic content determined relevant to at least the corresponding command template;
   employing, by the server device, a translation service to translate at least the corresponding command template and the determined relevant pieces of electronic content to a defined core language;
   adding, by the server device, the translated relevant pieces of electronic content mapped to at least the translated command template of the received action dataset to a repository, the repository being searchable to identify the action dataset based on a received command representation transcribed in one of the foreign language or another foreign language.

2. The computer-implemented method of claim 1, wherein the corresponding command template includes a defined set of parameter fields, wherein the translated command template is mapped to the corresponding command template including the defined set of parameter fields.

3. The computer-implemented method of claim 1, further comprising:
   translating, by the server device, the received command representation from one of the foreign language or the other foreign language to the core language, the translated command representation being employed to search the repository and identify the action dataset.

4. The computer-implemented method of claim 1, wherein the command representation is received from one of a plurality of remote client devices having the digital assistant application executing thereon.

5. The computer-implemented method of claim 1, wherein the translated relevant pieces of electronic content are further mapped to the command template transcribed in the foreign language.

6. The computer-implemented method of claim 1, wherein each piece of the translated relevant pieces of electronic content is mapped to the translated command template by modifying or adding a title to the piece to recite at least a portion of the translated command template.

7. The computer-implemented method of claim 1, further comprising employing a foreign language application to identify the foreign language employed in the query.

8. The computer-implemented method of claim 1, wherein the digital assistant application is configured to emulate the set of inputs in response to a determination that a received command representation corresponds to one of a set of command templates indexed by at least one of the remote client device and the server device.

9. A non-transitory computer storage medium storing computer-useable instructions that, when used by at least one computing device, cause the at least one computing device to perform operations to communicate action datasets indexed in a core language based on commands received in a foreign language, comprising:
   receiving, by a server, a command representation from a digital assistant application installed on a remote client computing device, the command representation being transcribed in the foreign language;
   translating, by the server, the received command representation into the core language;
   querying, by the server, a plurality of indexed action datasets stored thereon, the plurality of action datasets being indexed in at least the core language, each action dataset including a corresponding set of command templates and inputs associated with one of a plurality of applications;
   selecting, by the server, at least one action dataset from the plurality of indexed action datasets determined to be most relevant to the translated command representation; and
   communicating, by the server, the selected at least one action dataset to the remote client computing device to invoke thereon the corresponding set of inputs associated with one of the plurality of applications.

10. The non-transitory computer storage medium of claim 9, wherein each action dataset in at least a portion of the plurality of indexed action datasets is mapped to a corresponding set of electronic content pieces transcribed in the core language, the corresponding set of electronic content pieces having been retrieved in one of a plurality of foreign languages and translated to the core language when the action dataset was on-boarded to the server, and wherein each corresponding set of electronic content pieces is queried based on the plurality of indexed action datasets being queried.

11. The non-transitory computer storage medium of claim 10, wherein querying the plurality of indexed action datasets includes a search of the plurality of corresponding sets of electronic content pieces.

12. The non-transitory computer storage medium of claim 9, wherein the received command representation includes at least one parameter, and wherein the selected at least one action dataset includes at least one corresponding parameter field, the operations further comprising: extracting the at least one parameter from the received command representation based on the at least one corresponding parameter field.

13. The non-transitory computer storage medium of claim 12, further communicating the extracted at least one parameter to the remote client computing device to invoke thereon the corresponding set of inputs associated with one of the plurality of applications.

14. The non-transitory computer storage medium of claim 9, wherein each action dataset in at least a portion of the plurality of indexed action datasets is further mapped to a corresponding foreign language command template, the corresponding foreign language command template having been included in the action dataset when it was on-boarded to the server.

15. The non-transitory computer storage medium of claim 9, wherein only a set of action datasets from the plurality of action datasets is queried based on a determination that a corresponding set of applications from the plurality of applications is installed on the remote client computing device.

16. A computer-implemented method for receiving action datasets indexed in a core language based upon command representations received in a foreign language, comprising:

receiving, by a digital assistant application executing on a client computing device, a command representation transcribed in a foreign language and corresponding to a particular application installed on the client computing device;

communicating, by the digital assistant application, the foreign language command representation to a server having a plurality of action datasets indexed in the core language, each of the plurality of action datasets including at least a corresponding set of inputs and a corresponding set of command templates;

receiving, by the digital assistant application and from the server, one or more action datasets, selected from the plurality of indexed action datasets, based on a determination that at least one core language command template included in one or more action datasets is most relevant to at least a core language translation of the received command representation.

17. The computer-implemented method of claim 16, wherein the one or more action datasets is received based further on a determination that at least one translated set of electronic content pieces, retrieved based at least in part on a foreign language command template included in the one or more action datasets when each was on-boarded, is most relevant to the core language translation of the received command representation.

18. The computer-implemented method of claim 17, wherein the at least one translated set of electronic content pieces is mapped to the selected one or more action datasets.

19. The computer-implemented method of claim 16, wherein the command representation includes at least one parameter, and wherein at least one command template in the corresponding set of command templates includes at least one parameter field that corresponds to the at least one parameter.

20. The computer-implemented method of claim 16, wherein at least a portion of the plurality of action datasets indexed in the core language was on-boarded thereto including at least one command template transcribed in one of a plurality of foreign languages.

* * * * *